(No Model.)
O. PUVREZ.
FILTER FOR THE MANUFACTURE OF SUGAR, &c.
No. 286,960. Patented Oct. 16, 1883.
Fig. 1.
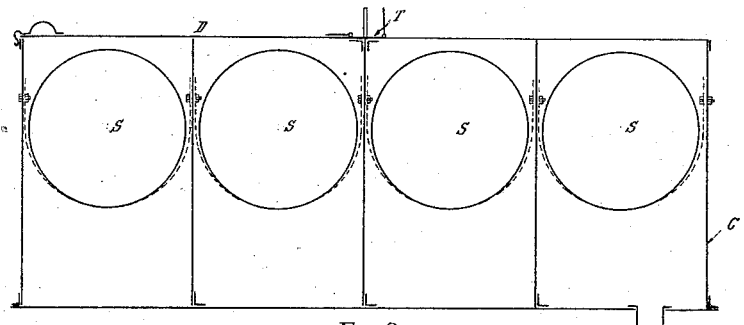
Fig. 2.
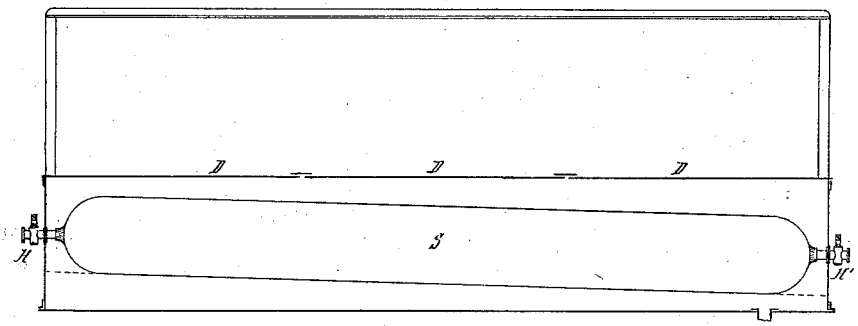
Fig. 6.
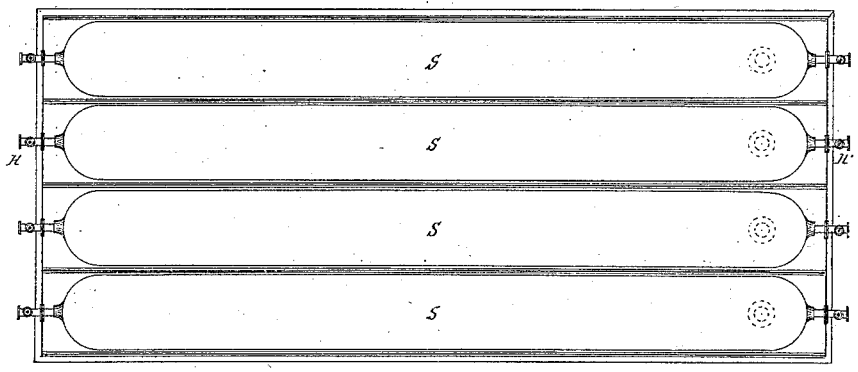
Fig. 3. Fig. 4. Fig. 5.
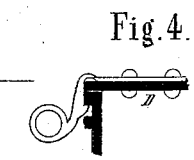
Witnesses
Charles B. Buckley
Herbert Knight
Inventor
Oscar Puvrez
by
Knight Bro

UNITED STATES PATENT OFFICE.

OSCAR PUVREZ, OF LEUZE, BELGIUM.

FILTER FOR THE MANUFACTURE OF SUGAR, &c.

SPECIFICATION forming part of Letters Patent No. 286,960, dated October 16, 1883.

Application filed July 16, 1883. (No model.) Patented in Russia May 14, 1883, No. 3,239; in Austria May 21, 1883, No. 2,938; in Germany May 23, 1883, No. 2,942; in France May 23, 1883, No. 143,285, and in Belgium May 23, 1883, No. 44,841.

*To all whom it may concern:*

Be it known that I, OSCAR PUVREZ, a subject of the King of Belgium, residing at Leuze, in the Kingdom of Belgium, have invented certain new and useful Improvements in Filters for the Manufacture of Sugar, &c., of which the following is a specification.

My invention relates to that class of filters for ridding sirups, &c., of deleterious matter, in which the matter to be treated is passed through a sack formed of fabric of the requisite porosity.

A serious objection to the use of fabric filters in the manufacture of sugar is their susceptibility to becoming inoperative by reason of the meshes becoming choked up on the inside of the sack or pocket by a thick mucilaginous substance consisting of various impurities, together with chilled sirup.

The objects of my invention are, first, to produce a filtering apparatus in which the sacks are readily removable for the purpose of cleansing; secondly, to produce an apparatus which shall support the intermediate portions of the sacks, which may be of any shape, but are preferably cylindrical, while allowing the sirup to flow freely through it; and, thirdly, to provide a filtering apparatus in which the requisite temperature may be maintained to prevent cooling of the sirup.

In the accompanying drawings, Figure 1 is a vertical transverse section of my improved filtering apparatus. Fig. 2 is a vertical longitudinal section. Figs. 3, 4, and 5 are enlarged sectional views of the hinge, latch, and catch, respectively. Fig. 6 is a horizontal section of the apparatus.

G represents a series of troughs, which may be of any approved shape, but are preferably rectangular, as here shown. Each of these troughs is provided with a semicircular trough, A, formed of wire or any other suitable metallic gauze secured to the side walls of the troughs G and running the entire length thereof.

S are the filtering sacks or pockets, which are secured in any suitable manner to the ingress-pipe at one end and the egress-pipe at the other. The trough A serves to support the intermediate portions of the filtering-sack, while offering no resistance to the free passage of the sirup, which runs through them and falls into the trough below, whence it is conducted through spouts G' to any desired receptacle.

In order to avoid cooling the sirup while being filtered, I provide the apparatus with suitable covers, D, hinged to a metallic bar, T, running lengthwise the apparatus. The doors open toward each other, and are held in an open position by a suitable catch mounted on the top of a standard, W.

The operation of the device is as follows: The egress-cock H' being first closed, the ingress-cock H is opened, and the sirup allowed to flow into and fill the sacks S. The sirup quickly finds its way through the meshes of the sack unobstructed by the trough A, and runs down into the trough G below. When the meshes of the sacks have become so choked by impurities, &c., as to retard the flow of the sirup, the cock H is closed and the cock H' opened, and the sack thereby drained of the thick accumulation. It is then loosened at its ends and replaced by a clean one. The sacks and their supporting-troughs slope toward the delivery end in order to facilitate emptying.

Having thus described my invention, the following is what I claim as new therein and desire to secure by Letters Patent:

1. A filter consisting of a sack supported by a wire-gauze, substantially as described.

2. A filter consisting of a removable sack suitably supported, and provided with an ingress and egress cock, as set forth.

3. A filter consisting of a sack having an ingress and egress port, and supported by a sloping trough of wire or other gauze, substantially as set forth.

4. A filter consisting of a series of removable sacks suitably supported, and inclosed in a suitable casing, substantially as and for the purpose set forth.

In testimony whereof I have signed this specification in the presence of two subscribing witnesses.

OSCAR PUVREZ.

Witnesses:
EMILE PICARD,
J. B. DELLUAGE.